UNITED STATES PATENT OFFICE.

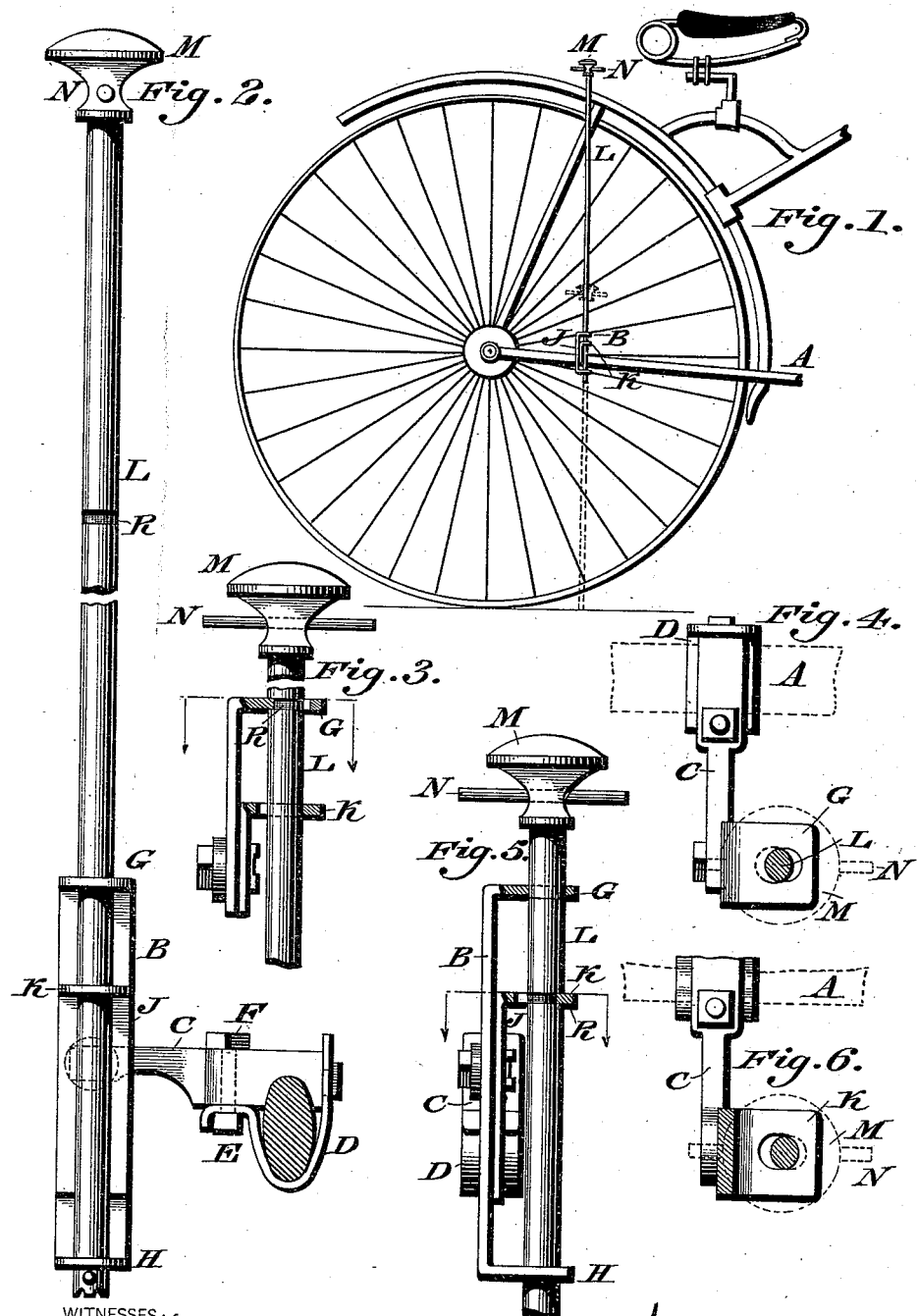

JOHN M. ANCK, OF PHILADELPHIA, PENNSYLVANIA.

BICYCLE-SUPPORT.

SPECIFICATION forming part of Letters Patent No. 447,125, dated February 24, 1891.

Application filed September 11, 1890. Serial No. 364,669. (No model.)

*To all whom it may concern:*

Be it known that I, JOHN M. ANCK, a citizen of the United States, residing in the city and county of Philadelphia, State of Pennsylvania, have invented a new and useful Improvement in Bicycle-Supports, which improvement is fully set forth in the following specification and accompanying drawings.

My invention consists of a prop connectible with a bicycle for supporting the same when at rest and adapted to be placed in an inoperative position when the bicycle is running.

It further consists of novel means for locking said support.

It finally consists of the combination of parts hereinafter set forth.

Figure 1 represents a side view of portion of a bicycle having a prop embodying my invention. Figs. 2 represents a side view of the prop and guiding-bracket shown in Fig. 1 on an enlarged scale. Fig. 3 represents a side view of the upper end of the prop when engaged by one limb of the guide-bracket. Fig. 4 represents a horizontal section on line $x\, x$, Fig. 3. Fig. 5 represents a side view of the upper end of the prop when engaged by the controlling-spring. Fig. 6 represents a horizontal section on line $y\, y$, Fig. 5.

Similar letters of reference indicate corresponding parts in the several figures.

Referring to the drawings, A designates a portion of the frame of a bicycle of any well-known or usual construction, and B designates a bracket or guide secured thereto by means of the arm C, which, as shown, is adapted to be fastened to the frame by a clip D, screw-bolt E, and nut F. One end of the said clip D is loosely connected with the arm C, so as to permit a movement thereon, and thus adapt it to different-sized frames. The bracket B is provided with ears G H, and has secured to it a spring J, having an ear K, which is substantially parallel with the ears G H.

L designates a prop, which is fitted in the ears G H K and provided with a head M, which has a pin N projecting horizontally therefrom. On the side of the prop L and near the head M is a notch or recess T, the walls of which are adapted to be engaged, as hereinafter described, by the ears G H K, the pin N acting as a guide to indicate the location of said notch.

The manner of operating the device is as follows: The prop L, being in a raised position, is pushed downward until it reaches the ground, when, owing to its length and the position of the spring, the walls of the ear of the spring coincide with the notch T, so as to enter the same, and thereby hold the prop in locked position. When it is desired to release the prop, the latter is turned by means of its head a partial revolution, so that the portion of the prop on the opposite side thereof from the notch is in contact with the spring, thereby forcing the latter outward, so as to permit the prop to be drawn upward until it comes in contact with the upper ear of the bracket, when, owing to the force of the spring bearing on the rod, the walls of the notch are brought into engagement with the wall of said ear, thereby locking the prop. When the latter is again turned a partial revolution, so that the full portion of the prop opposite the notch is in contact with the said wall, the prop can be raised to the position first described, in which it is held during the running of the bicycle.

It will be seen that the device is simple in its manner of operation and of few parts, and can be readily attached to any bicycle or detached therefrom without changing the parts of the latter.

Having thus described my invention, what I claim as new, and desire to secure by Letters Patent, is—

1. A bicycle-support consisting of a movable prop having a notch, and a spring-actuated ear to engage said notch, said parts being combined substantially as described.

2. A bicycle-support consisting of a movable prop having a notch, a bracket with ears in which said prop is adapted to operate, and having a spring with an ear to engage the notch of said prop, and an adjustable clip for attaching the prop to the bicycle, said parts being combined substantially as described.

3. In a bicycle-support, a bracket with a prop movable therein, and a supporting-arm secured to said bracket and having an adjustable clip for attachment to the bicycle, said parts being combined substantially as described.

4. A bicycle-support consisting of a rod having a notch, a bracket having ears, and a spring with an ear, said rod being movable in said ears, substantially as described.

JOHN M. ANCK.

Witnesses:
JOHN A. WIEDERSHEIM,
A. P. JENNINGS.